United States Patent
Tomioka et al.

(10) Patent No.: US 10,623,107 B2
(45) Date of Patent: Apr. 14, 2020

(54) OPTICAL TRANSMISSION DEVICE AND METHOD FOR CONTROLLING OPTICAL TRANSMISSION DEVICE

(71) Applicant: Fujitsu Optical Components Limited, Kawasaki-shi, Kanagawa (JP)

(72) Inventors: Takeyasu Tomioka, Sapporo (JP); Shuichi Yasuda, Sapporo (JP)

(73) Assignee: FUJITSU OPTICAL COMPONENTS LIMITED, Kawasaki (JP)

(*) Notice: Subject to any disclaimer, the term of this patent is extended or adjusted under 35 U.S.C. 154(b) by 0 days.

(21) Appl. No.: 16/293,105

(22) Filed: Mar. 5, 2019

(65) Prior Publication Data

US 2019/0349088 A1 Nov. 14, 2019

(51) Int. Cl.
| | |
|---|---|
| H04B 10/564 | (2013.01) |
| H04B 10/296 | (2013.01) |
| H01S 3/13 | (2006.01) |
| H01S 3/067 | (2006.01) |
| H04B 10/572 | (2013.01) |

(52) U.S. Cl.
CPC ....... *H04B 10/564* (2013.01); *H01S 3/06754* (2013.01); *H01S 3/1301* (2013.01); *H04B 10/296* (2013.01); *H04B 10/572* (2013.01)

(58) Field of Classification Search
None
See application file for complete search history.

(56) References Cited

U.S. PATENT DOCUMENTS

| | | | |
|---|---|---|---|
| 2010/0134862 A1* | 6/2010 | Nagaeda | H01S 3/1301 359/239 |
| 2015/0304050 A1* | 10/2015 | Watanabe | H04B 10/541 398/186 |
| 2017/0212366 A1 | 7/2017 | Banno et al. | |

FOREIGN PATENT DOCUMENTS

| | | |
|---|---|---|
| JP | 6-45682 | 2/1994 |
| JP | 2008-300812 | 12/2008 |

* cited by examiner

*Primary Examiner* — David W Lambert

(57) ABSTRACT

An optical transmission device includes: a first drive unit that drives a VOA adjusting an attenuation amount for an optical signal from an optical amplifier; a second drive unit that drives an excitation light source of the optical amplifier; a first FF control unit that sets a first set value for the first drive unit and performs FF control; a second FF control unit that sets a second set value for the second drive unit and performs the FF control; a first control unit that controls the second drive unit in a manner that causes an optical output power from the optical amplifier to attain a first control target value; and a switch unit that switches to the first control unit when the optical output power corresponding to the second set value is attained as a result of FF control of the second FF control unit.

8 Claims, 11 Drawing Sheets

| VOA ATTENUATION AMOUNT [dB] | FIRST DRIVE UNIT SET VALUE [V] |
|---|---|
| 0 | 2.0 |
| 1 | 2.1 |
| 2 | 2.2 |
| ⋮ | ⋮ |

OPTICAL TRANSMISSION DEVICE AND METHOD FOR CONTROLLING OPTICAL TRANSMISSION DEVICE

CROSS-REFERENCE TO RELATED APPLICATION

This application is based upon and claims the benefit of priority of the prior Japanese Patent Application No. 2018-092568, filed on May 11, 2018, the entire contents of which are incorporated herein by reference.

FIELD

The embodiment discussed herein is related to an optical transmission device and a method for controlling an optical transmission device.

BACKGROUND

There has been known an optical transmission device that includes an erbium-doped fiber amplifier (EDFA) and a variable optical attenuator (VOA) so as to meet the needs of producing a high output and having a high optical signal-to-noise ratio (OSNR). This optical transmission device performs previous adjustment to find a monitored value of the optical output corresponding to optical output power of a target value. First, the VOA is controlled, whereby feed-forward control (FF control) is performed on a VOA digital-analog converter (DAC) so that a target optical output can be attained. The EDFA is then controlled, whereby feed-back control (FB control) is performed on an EDFA DAC, which drives an excitation light source for the EDFA, so that the monitored optical output value can attain a target value. An optical transmission device is thus started up.

Related conventional techniques include Japanese Laid-open Patent Publication No. 2008-300812 and Japanese Laid-open Patent Publication No. 06-45682.

A conventional optical transmission device, however, performs FB control on an EDFA after the FF control on a VOA is converged. The convergence of the FB control takes an undesirable length of time because FB control uses a gain such that optical output does not overshoot. As a result, starting up the optical transmission device takes an undesirable length of time.

SUMMARY

According to an aspect of an embodiment, an optical transmission device includes an optical amplifier including an excitation light source and an optical amplification medium into which an optical signal and excitation light emitted from the excitation light source are guided; a variable optical attenuator that adjusts an attenuation amount of the optical signal that is output from the optical amplifier; a first drive unit that drives the variable optical attenuator; a second drive unit that drives the excitation light source; a first photo-detector that branches a part of the optical signal output from the optical amplifier and detects optical output power of the branched part of the optical signal; a first FF control unit that sets a first set value for the first drive unit at a time of startup and performs feed-forward control on the first drive unit; a second FF control unit that sets a second set value for the second drive unit at the time of startup and performs feed-forward control on the second drive unit; a first control unit that controls the second drive unit in a manner that causes the optical output power of the optical signal from the optical amplifier to attain a first control target value, the optical output power being detected by the first photo-detector; and a first switch unit that switches from the second FF control unit to the first control unit when the optical output power from the optical amplifier that corresponds to the second set value is attained as a result of feed-forward control performed by the second FF control unit.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 2 is a diagram illustrating an example of VOA conversion information;

DESCRIPTION OF EMBODIMENT

Preferred Embodiment of the Present Invention will be explained with reference to accompanying drawings. The present embodiment is not intended to limit the present invention.

Figure 1:
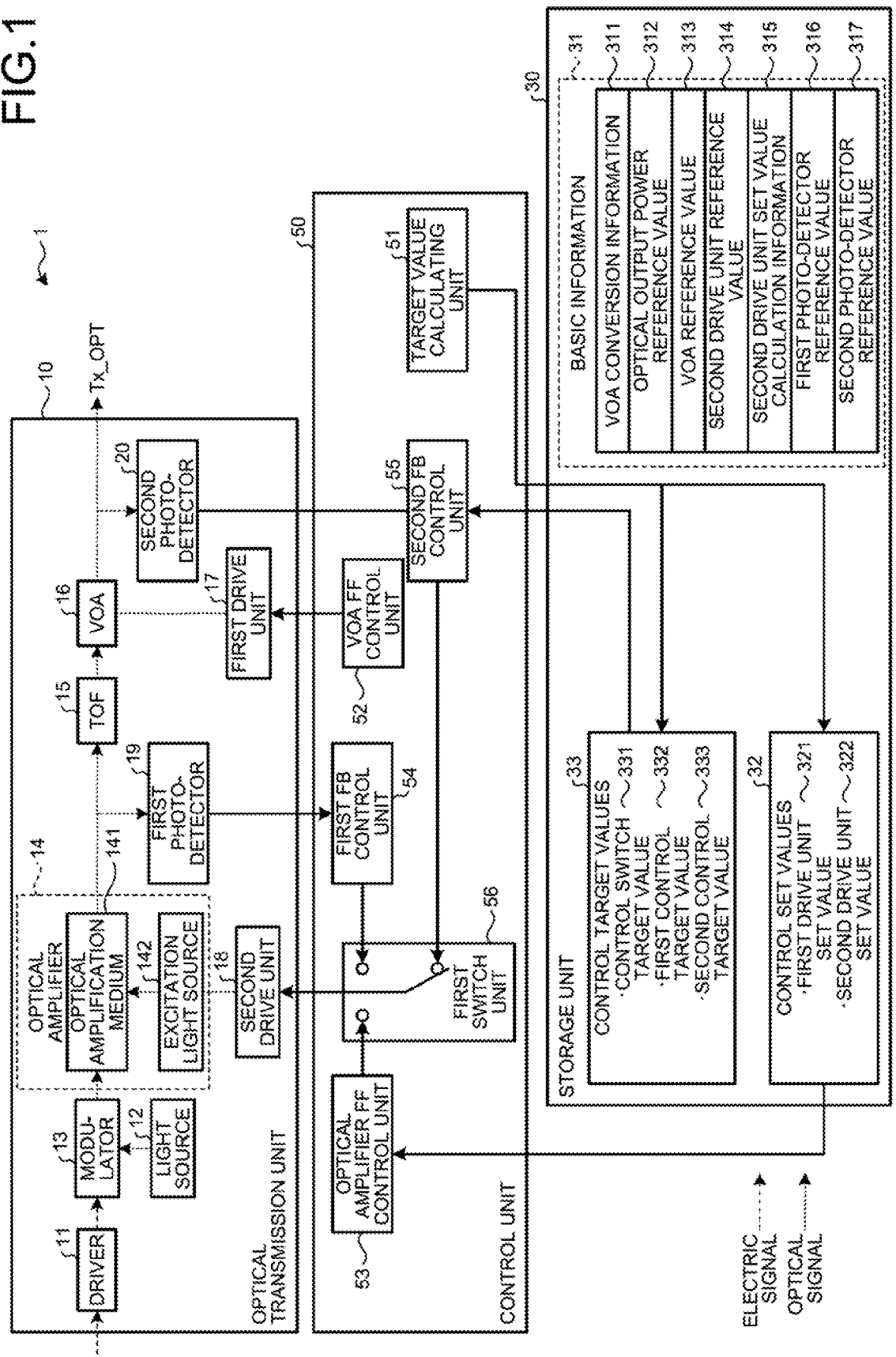
FIG. 1 is a diagram schematically illustrating an example of the configuration of an optical transmission device according to an embodiment.

FIG. 1 is a diagram schematically illustrating an example of the configuration of the optical transmission device according to the embodiment. An optical transmission device 1 includes an optical transmission unit 10, a storage unit 30, and a control unit 50.

The optical transmission unit 10 converts an input data signal into an optical signal and amplifies and then outputs the optical signal. The optical transmission unit 10 includes a driver 11, a light source 12, a modulator 13, an optical amplifier 14, a tunable optical filter (TOF) 15, a VOA 16, a first drive unit 17, a second drive unit 18, a first photo-detector 19, and a second photo-detector 20.

The driver 11 is a circuit that drives the modulator 13 in accordance with a data signal. For example, the driver 11 drives the modulator 13 with the current that corresponds to a data signal.

The light source 12 emits light with a certain wavelength. The light source 12 is, for example, a semiconductor laser diode (LD). The LD may be an LD that emits light with a fixed wavelength, or a tunable LD, which emits light with a variable wavelength.

When driven by a drive signal input from the driver 11 and having a signal waveform that corresponds to a transmission data signal, the modulator 13 modulates, based on the transmission data signal, light input from the light source 12. Light modulated based on the transmission data signal is hereinafter referred to as an optical signal.

The optical amplifier 14 includes an optical amplification medium 141 and an excitation light source 142. The optical amplification medium 141 amplifies, using excitation light output from the excitation light source 142, an optical signal output from the modulator 13. The optical amplification medium 141 is, for example, an optical fiber amplifier (EDFA) that has erbium added thereto as an example of rare-earth elements. The excitation light source 142 outputs excitation light to be input to the optical amplification medium 141. When an EDFA is used as the optical amplification medium 141, the excitation light source 142 is, for example, an LD that outputs laser light of 0.98 μm or 1.48 μm.

The TOF 15 is an optical filter disposed to the output side of the optical amplifier 14 and exclusively allowing an optical signal with a desired wavelength to pass therethrough.

The VOA 16 adjusts the power of output light under the control of the first drive unit 17 by adjusting respective attenuation amounts of optical signals input from the TOF 15 that have various wavelengths.

The first drive unit 17 drives the VOA 16. The first drive unit 17 is, for example, a DAC. The first drive unit 17 controls each attenuation amount for the VOA 16 into an appropriate value in accordance with a control signal from the control unit 50.

The second drive unit 18 drives the optical amplifier 14, more specifically, the excitation light source 142 in this particular example. The second drive unit 18 is, for example, a DAC. In accordance with a control signal from the control unit 50, the second drive unit 18 controls current to be supplied to the excitation light source 142.

Disposed to the output side of the optical amplifier 14, more specifically, between the optical amplifier 14 and the TOF 15 in the illustrated example, the first photo-detector 19 detects power of the wavelength of a part of each optical signal output from the optical amplifier 14 (the optical amplification medium 141) and outputs the detection result to the control unit 50, the part being branched from the optical signal by a certain ratio. For example, approximately 1 to 10 percent of light output from the optical amplifier 14 is input to the first photo-detector 19. The first photo-detector 19 is, for example, a tap photodiode. The first photo-detector 19 detects the power of each optical signal output from the optical amplifier 14.

Disposed at the output side of the VOA 16, the second photo-detector 20 detects power (hereinafter referred to as external output power) of the wavelength of a part of each optical signal output from the VOA 16 and outputs the detection result to the control unit 50, the part being branched from the optical signal by a certain ratio. The second photo-detector 20 is, for example, a tap photodiode. For example, approximately 1 to 10 percent of light output from the VOA 16 is input to the second photo-detector 20.

The storage unit 30 stores therein information to be used by the control unit 50 for control on the optical transmission unit 10. The storage unit 30 stores therein: basic information 31 to be used for calculating set values for FF control and target values for FB control; control set values 32; and control target values 33.

The basic information 31 includes, for example, VOA conversion information 311, an optical output power reference value 312, a VOA reference value 313, a second drive unit reference value 314, second drive unit set value calculation information 315, a first photo-detector reference value 316, and a second photo-detector reference value 317.

The VOA conversion information 311 is information indicating set values for the first drive unit 17 that correspond to various attenuation amounts for the VOA 16, and is information to be used in calculating a first drive unit set value 321. The VOA conversion information 311 is obtained in advance through measurement. FIG. 2 is a diagram illustrating an example of the VOA conversion information. As illustrated in this diagram, voltages to be applied to the VOA 16 that can be used for attaining various attenuation amounts needed for the VOA 16, that is, voltage values to be set for the first drive unit 17, are stored as the VOA conversion information 311 in association with the attenuation amounts.

The optical output power reference value 312 is a value of the optical output power to be externally output when there is no designated optical output power value set for the optical transmission device 1. The following description assumes that the optical output power reference value 312 is 0 dBm.

The VOA reference value 313 is a value for the VOA 16 to be used for obtaining an intended OSNR value. The following example assumes that the VOA reference value 313 is 10 dB when the optical output power reference value 312 (0 dBm) is output.

The second drive unit reference value 314 is a measured value for the second drive unit 18 obtained when the external output power is at 0 dBm on condition that the VOA attenuation amount is set to 10 dB (the VOA reference value 313). This second drive unit reference value 314 is used for calculating a second drive unit set value 322.

The second drive unit set value calculation information 315 is a function to be used for calculating the second drive unit set value 322. The second drive unit set value calculation information 315 is, for example, an I-L characteristic approximation formula. The I-L characteristic approximation formula is a coefficient value of a linear approximation formula calculated for the characteristic of the relation between input current and optical output from the optical amplifier 14 (hereinafter referred to as the I-L characteristic). The I-L characteristic is obtained in advance through measurement with the optical amplifier 14. For example, the second drive unit set value calculation information 315 is a formula that calculates the second drive unit set value 322 from a designated optical output power value, the optical output power reference value 312, and the second drive unit reference value 314.

The first photo-detector reference value 316 is an optical intensity value from the first photo-detector 19 measured when the external output power is at 0 dBm on condition that the VOA attenuation amount is set to 10 dB (the VOA reference value 313). The first photo-detector reference value 316 is used for calculating a first photo-detector target value.

The second photo-detector reference value 317 is an optical intensity value from the second photo-detector 20 measured with the optical output power reference value 312 (0 dBm). The second photo-detector reference value 317 is used for calculating a second photo-detector target value.

The control set values 32 are set values for the first drive unit 17 and the second drive unit 18 that are to be used when FF control is performed on the first drive unit 17 and the second drive unit 18 after the optical transmission device 1 is started up. The control set values 32 include the first drive unit set value 321 and the second drive unit set value 322.

The control target values 33 are target values for the optical output power detected by the second photo-detector 20 or the first photo-detector 19, the target values being to be used for FB control by the second drive unit 18 after the second drive unit 18 completes FF control. The control target values 33 include a control switch target value 331, a first control target value 332, and a second control target value 333.

The control switch target value 331 is the optical output power from the optical amplifier 14 at the time when the second drive unit 18 switches from FF control to FB control. That is, the control switch target value 331 is the optical output power from the optical amplifier 14 at the time when the second drive unit set value 322 is set for the second drive unit 18.

The first control target value 332 is a target value of the optical output power detected by the first photo-detector 19, the target value being used for FB control performed by the second drive unit 18. The first control target value 332 is to be used after the second drive unit 18 switches to FB control.

The second control target value 333 is a target value of external output power detected by the second photo-detector 20, the target value being used for FB control performed by the second drive unit 18. The second control target value 333 is used after the optical output power detected by the first photo-detector 19 attains the first control target value 332.

The control unit 50 controls the first drive unit 17 and the second drive unit 18 at the time of startup so that the target optical output power is output. The control unit 50 includes a target value calculating unit 51, a VOA FF control unit 52, an optical amplifier FF control unit 53, a first FB control unit 54, a second FB control unit 55, and a first switch unit 56.

The target value calculating unit 51 has: a set value calculation function by which to calculate set values for FF control in the first drive unit 17 and the second drive unit 18 and store the set values in the storage unit 30; and a target value calculation function by which to calculate target values for FB control in the second drive unit 18 and store the target values in the storage unit 30.

The set value calculation function functions to, after the start of the control, calculate set values for FF control in the first drive unit 17 and the second drive unit 18 that correspond to a designated optical output power value.

When calculating a voltage value to be set for the first drive unit 17, that is, the first drive unit set value 321, the target value calculating unit 51 calculates an attenuation amount to be set for the VOA 16 through Formula (1) given below, using the VOA reference value 313 and the optical output power reference value 312 that are read out from the storage unit 30, and the designated optical output power value that has been previously set:

$$\text{Attenuation amount to be set (dB)} = \text{VOA reference value (dB)} + (\text{Optical output power reference value (dBm)} - \text{Designated optical output power value (dBm)}) \quad (1)$$

After calculating the attenuation amount to be set for the VOA 16, the target value calculating unit 51 acquires, from the VOA conversion information 311, a voltage value that corresponds to the attenuation amount to be set and that is to be applied to the VOA 16. The voltage value thus acquired is the first drive unit set value 321.

When calculating a voltage value to be set for the second drive unit 18, that is, the second drive unit set value 322, the target value calculating unit 51 calculates the second drive unit set value 322 through Formula (2) given below, using the second drive unit reference value 314 and the optical output power reference value 312 that are read out from the storage unit 30, and the designated optical output power value that has been previously set:

$$\text{Second drive unit set value} = 10^{((\text{Designated optical output power value (dBm)} - \text{Optical output power reference value (dBm)}) \div 10)} \times \text{Second drive unit reference value} \quad (2)$$

The target value calculation function functions to calculate the control switch target value 331, the first control target value 332, and the second control target value 333 that correspond to the designated optical output power value after the second drive unit 18 starts FF control. For example, the target value calculating unit 51 calculates the control switch target value 331 and the second control target value 333 to be detected by the first photo-detector 19 and the second photo-detector 20 that correspond to the designated optical output power value. In addition, after the optical output power detected by the first photo-detector 19 attains the control switch target value 331, the first control target value 332 is calculated which is the optical output power from the optical amplifier 14 for keeping the slope of the external output with respect to time from declining until the external output attains the second control target value 333.

When the startup process is started, the VOA FF control unit 52 reads out the first drive unit set value 321 from the storage unit 30 and sets the first drive unit set value 321 for the first drive unit 17. That is, the VOA FF control unit 52 is a first FF control unit that performs FF control on the first drive unit 17 in accordance with the first drive unit set value 321.

When the startup process is started, the optical amplifier FF control unit 53 reads out the second drive unit set value 322 from the storage unit 30 and sets the second drive unit set value 322 for the second drive unit 18. That is, the optical amplifier FF control unit 53 is a second FF control unit that performs FF control on the second drive unit 18 in accordance with the second drive unit set value 322.

When the optical output power from the optical amplifier 14 detected by the first photo-detector 19 attains the control switch target value 331, the first FB control unit 54 acquires the first control target value 332 from the storage unit 30 and performs FB control on the second drive unit 18 so that the optical output power from the optical amplifier 14 can attain the first control target value 332. That is, the first FB control unit 54 is a first control unit that performs FB control on a voltage value to be set for the second drive unit 18 so that the optical output power (hereinafter also referred to as a first monitored value) detected by the first photo-detector 19 can attain the first control target value 332. Note that determination as to whether the optical output power from the optical amplifier 14 has attained the control switch target value 331 is made through monitoring whether the control switch target value 331 has been detected by the first photo-detector 19.

When the optical output power from the optical amplifier 14 detected by the first photo-detector 19 attains the first control target value 332, the second FB control unit 55 acquires the second control target value 333 from the storage unit 30 and performs FB control on the second drive unit 18 so that the external output from the VOA 16 can attain the second control target value 333. That is, the second FB control unit 55 is a FB control unit that performs FB control on a voltage value to be set for the first drive unit 17 so that an optical output power (hereinafter also referred to as a second monitored value) detected by the second photo-detector 20 can attain the second control target value 333.

The first switch unit 56 switches, between the optical amplifier FF control unit 53, the first FB control unit 54, and the second FB control unit 55, control performed on the second drive unit 18. That is, the control is switched so that: at the time of startup, the second drive unit 18 can be controlled by the optical amplifier FF control unit 53; during FF control, the second drive unit 18 can be controlled by the first FB control unit 54 when an optical output power detected by the first photo-detector 19 has attained the control switch target value 331; and, during the FB control, the second drive unit 18 can be controlled by the second FB control unit 55 when the optical output power detected by the first photo-detector 19 has attained the first control target value 332.

Figure 3:
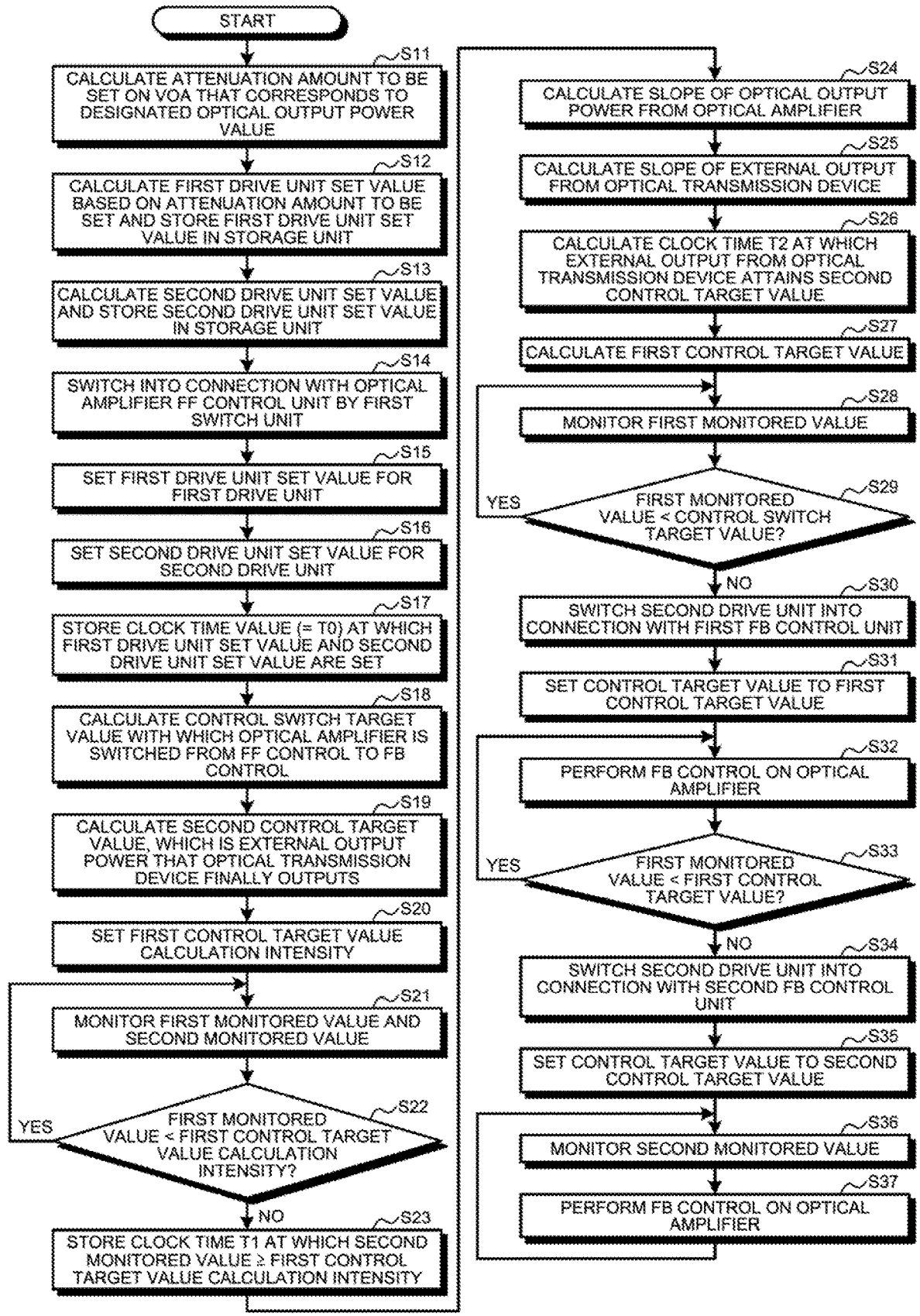
FIG. 3 is a flowchart illustrating an example of the procedure of a control process in the optical transmission device according to the embodiment.
Figure 4:
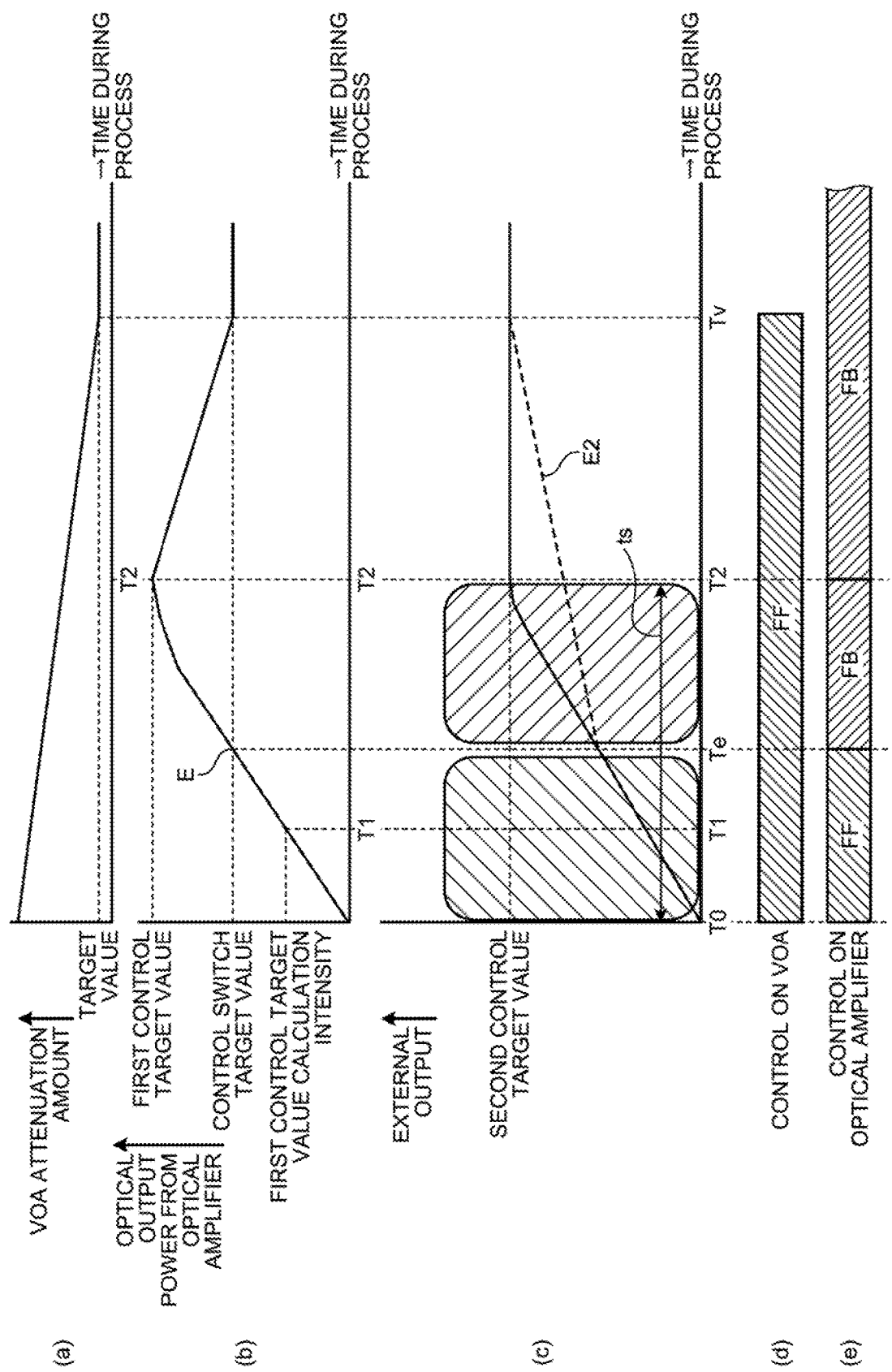
FIG. 4 is a time chart illustrating an example of the procedure of the control process in the optical transmission device according to the embodiment.

Next, processes in the optical transmission device 1 having the above-described configuration are described. FIG. 3 is a flowchart illustrating an example of the procedure of a control process in the optical transmission device according to the embodiment. FIG. 4 is a time chart illustrating an example of the procedure of the control process in the optical transmission device according to the embodiment. Part (a) of FIG. 4 is a diagram illustrating change in attenuation amount for the VOA over time with the horizontal axis representing the time during the process and the vertical axis representing the attenuation amount for the VOA. Part (b) of FIG. 4 is a diagram illustrating change in optical output from the optical amplifier over time with the horizontal axis representing the time during the process and the vertical axis representing the output value of the optical amplifier monitored by the first photo-detector. Part (c) of FIG. 4 is a diagram illustrating change in optical output from the optical transmission device over time with the horizontal axis representing the time during the process and the vertical axis representing the output value of the optical transmission device monitored by the second photo-detector. Part (d) of FIG. 4 is a diagram illustrating control modes for the VOA, and part (e) of FIG. 4 is a diagram illustrating control modes for the optical amplifier.

When the optical transmission device 1 is started up, the target value calculating unit 51 in the control unit 50 calculates an attenuation amount to be set for the VOA 16 that corresponds to the designated optical output power value that has been set (Step S11). Specifically, the target value calculating unit 51 reads out the VOA reference value 313 and the optical output power reference value 312 from the storage unit 30 and, using Formula (1), calculates the attenuation amount to be set. The target value calculating unit 51 then calculates the first drive unit set value 321 based on the attenuation amount to be set and stores the first drive unit set value 321 in the storage unit 30 (Step S12). Specifically, the target value calculating unit 51 acquires, with reference to the VOA conversion information 311 in the storage unit 30, a voltage value to be applied to the VOA 16 that corresponds to the attenuation amount to be set and stores the acquired voltage value as the first drive unit set value 321 in the storage unit 30.

The target value calculating unit 51 also calculates the second drive unit set value 322 that corresponds to the designated optical output power value that has been set and stores the second drive unit set value 322 in the storage unit 30 (Step S13). Specifically, the target value calculating unit 51 reads out the optical output power reference value 312 and the second drive unit reference value 314 from the storage unit 30 and, using the second drive unit set value calculation information 315 (the linear I-L characteristic approximation formula) expressed as Formula (2), calculates the second drive unit set value 322.

The first switch unit 56 then switches so that the second drive unit 18 can be connected to the optical amplifier FF control unit 53 (Step S14). Thereafter, the VOA FF control unit 52 acquires the first drive unit set value 321 from the storage unit 30 and sets the first drive unit set value 321 for the first drive unit 17 (Step S15), and the optical amplifier FF control unit 53 acquires the second drive unit set value 322 from the storage unit 30 and sets the second drive unit set value 322 for the second drive unit 18 (Step S16). Consequently, the first drive unit 17 applies voltage indicated as the first drive unit set value 321 to the VOA 16, and the second drive unit 18 applies voltage indicated as the second drive unit set value 322 to the excitation light source 142. That is, FF control performed on the first drive unit 17 by the VOA FF control unit 52 and FF control performed on the second drive unit 18 by the optical amplifier FF control unit 53 are started in parallel.

Thereafter, the optical amplifier FF control unit 53 or the VOA FF control unit 52 stores a clock time (assumed as T0 in this example) at which the first drive unit set value 321 and the second drive unit set value 322 are set, that is, a clock time at which the FF control is started, in the storage unit 30 (Step S17).

After the FF control is started, the target value calculating unit 51 performs a process of calculating a target value for performing FB control on the optical amplifier 14. In this example, the target value calculating unit 51 starts the process by calculating the control switch target value 331 with which the optical amplifier 14 is switched from FF control to FB control (Step S18). The control switch target value 331 is the optical output power from the optical amplifier 14 detected by the first photo-detector 19 when the second drive unit set value 322 is applied to the excitation light source 142. The target value calculating unit 51 acquires the optical output power reference value 312 and the first photo-detector reference value 316 from the storage unit 30 and calculates the control switch target value 331 through, for example, Formula (3) given below:

Control switch target value=$10\hat{}$((Designated optical output power value (dBm)−Optical output power reference value (dBm))÷10)×First photo-detector reference value    (3)

When the optical output power is at the designated optical output power value, the target value calculating unit 51 calculates the second control target value 333, which is external output power that the optical transmission device 1 finally outputs (Step S19). Specifically, the target value calculating unit 51 acquires the optical output power reference value 312 and the second photo-detector reference value 317 from the storage unit 30 and calculates the second control target value 333 through, for example, Formula (4):

Second control target value=10^((Designated optical
output power value (dBm)−Optical output
power reference value (dBm))÷10)×Second
photo-detector reference value     (4)

Furthermore, the target value calculating unit 51 sets a first control target value calculation intensity, which is the timing to calculate the first control target value 332 for FB control after FF control is performed on the optical amplifier 14 (Step S20). The first control target value calculation intensity is set to a smaller value than the control switch target value 331. As the first control target value calculation intensity, a value that is half the control switch target value 331 can be set, for example.

Thereafter, the optical output power (a first monitored value) detected by the first photo-detector 19 and the optical output power (a second monitored value) detected by the second photo-detector 20 are monitored (Step S21). The target value calculating unit 51 then determines whether the first monitored value is lower than the first control target value calculation intensity (Step S22). If the first monitored value is lower than the first control target value calculation intensity (Yes in Step S22), the process returns to Step S21.

If the first monitored value is not lower than the first control target value calculation intensity (No at Step S22), a clock time T1 at which the first monitored value attains the first control target value calculation intensity or higher is stored (Step S23). Assuming that a graph depicting the optical output power from the optical amplifier 14 against time is linear, the target value calculating unit 51 then calculates the slope of the graph (Step S24). Specifically, the slope of the optical output power from the optical amplifier 14 is calculated, through Formula (5) given below, using the clock time T0 at which FF control is started, the clock time T1 at which the first monitored value attains the first control target value calculation intensity, and the first control target value calculation intensity (that is, the first monitored value at the clock time T1):

Slope of the optical output power from the optical
amplifier=First monitored value÷(T1−T0)     (5)

Likewise, assuming that a graph depicting external output from the optical transmission device 1 against time is linear, the target value calculating unit 51 calculates the slope of the graph (Step S25). Specifically, the slope of external output from the optical transmission device 1 is calculated, through Formula (6) given below, using the clock time T0 at which the FF control is started, the clock time T1 at which the first monitored value attains the first control target value calculation intensity, and external output from the optical transmission device 1 at the clock time T1 (that is, the second monitored value at the clock time T1):

Slope of external output from the optical transmission device=Second monitored value÷(T1−T0)     (6)

Subsequently, the target value calculating unit 51 calculates a clock time T2 at which external output from the optical transmission device 1 attains the second control target value 333 (Step S26). This clock time T2 is a clock time at which the subject of FB control for the optical amplifier 14 is switched from the optical output power from the optical amplifier 14 to external output from the optical transmission device 1. In this example, a graph depicting external output from the optical transmission device 1 against time is assumed to be linear, and therefore the clock time T2 is calculated, through Formula (7) given below, using the second control target value 333 and the slope of external output from the optical transmission device 1:

T2=Second control target value÷Slope of a straight
line depicting output from the optical transmission device     (7)

The target value calculating unit 51 also calculates the first control target value 332, which is to be used when FB control is performed after the completion of FF control for the optical amplifier 14 (Step S27). In this step also, with the assumption that a graph depicting the optical output power from the optical amplifier 14 against time is linear, the first control target value 332 is calculated, through Formula (8) given below, using the slope of the optical output power from the optical amplifier 14, the clock time T2, and the clock time T0:

First control target value=Slope of the optical output
power from the optical amplifier×(T2−T0)     (8)

Thereafter, the first FB control unit 54 monitors the first monitored value detected by the first photo-detector 19 (Step S28) and determines whether the first monitored value is lower than the control switch target value 331 (Step S29). That is, based on whether the first monitored value has attained the control switch target value 331, the first FB control unit 54 determines whether the optical amplifier FF control unit 53 has completed the FF control. If the first monitored value is still lower than the control switch target value 331 (Yes in Step S29), the process returns to Step S28.

If the first monitored value is not lower than the control switch target value 331 (No in Step S29), that is, if the first monitored value has attained a switch control target value (the point E in part (b) of FIG. 4, which corresponds to a clock time Te) by being controlled by the optical amplifier FF control unit 53, the first switch unit 56 switches the second drive unit 18 into connection with the first FB control unit 54 (Step S30). The first FB control unit 54 sets a control target value to the first control target value 332 acquired from the storage unit 30 (Step S31) and performs FB control on the optical amplifier 14 (Step S32). Note that the optical amplifier 14 typically has a better response characteristic than the VOA 16. For example, while the response characteristic of the VOA 16 is in the order of milliseconds, the response characteristic of the optical amplifier 14 is in the order of 10 microseconds. Therefore, FF control on the optical amplifier 14 is completed earlier than FF control on the VOA 16, and the optical amplifier 14 is switched from FF control to FB control.

Here, if the optical amplifier 14 is controlled so that normal target values can be maintained, FF control over the VOA 16 is the only operation being performed to raise external output from the optical transmission device 1 after the point E at which the FF control on the optical amplifier 14 is completed (the optical output power from the optical amplifier 14 attains the switch control target value). Consequently, after the clock time Te at which the FF control on the optical amplifier 14 is completed, the graph illustrated in Part (c) of FIG. 4 continuously increases as represented by the straight line E2, indicating that the time needed to attain target external output increases according to the degree to which the slope is gentler. That is, when the VOA 16 attains a control target, the external output from the optical transmission device 1 naturally attains a target (the second control target value 333).

For that reason, the present embodiment aims to speed up the process after the point E in a manner such that, as described regarding Steps S30 to S32, the control of the optical amplifier 14 is switched from FF control to FB control when the point E is attained. Consequently, the output from the optical amplifier 14 continuously increases in parallel to FF control on the VOA 16, which enables the target external output to be attained in a short period of time without a decrease in the slope (output slope) of external output from the optical transmission device 1. At the E point, however, the optical amplifier 14 has already attained the switch control target value, and output from the optical amplifier 14 is not to increase even if FB control is performed on the optical amplifier 14 using this switch control target value. In this respect, the first control target value 332 is updated as described regarding Step S31, and FB control is performed so that the optical output power detected by the first photo-detector 19 can attain the first control target value 332.

The first photo-detector 19 is disposed in the input side of the VOA 16 as illustrated in FIG. 1 and is not affected by the VOA 16 even when FF control is being performed on the VOA 16. That is, FB control on the optical amplifier 14 can be performed in parallel with FF control on the VOA 16.

Thereafter, the first FB control unit 54 determines whether the first monitored value is lower than the first control target value 332 (Step S33). If the first monitored value is lower than the first control target value 332 (Yes in Step S33), the process returns to Step S32.

If the first monitored value is not lower than the first control target value 332 (No in Step S33), the first switch unit 56 switches the second drive unit 18 into connection with the second FB control unit 55 (Step S34). The second FB control unit 55 sets a control target value to the second control target value 333 (Step S35), and, while monitoring the second monitored value detected by the second photo-detector 20 (Step S36), performs FB control on the optical amplifier 14 (Step S37).

Note that the clock time T2 at which the first monitored value attains the first control target value 332 is also a clock time at which external output from the optical transmission device 1 attains the second control target value 333. That is, after the clock time T2, a targeted external output is obtained, and the process for starting up the optical transmission device 1 is thus deemed to have been completed. Therefore, a startup time period ts is (T2–T0) in the present embodiment.

However, FF control on the VOA 16 is still being performed at the clock time T2 and causes the external output from the optical transmission device 1 to increase beyond the second control target value 333 after the clock time T2. To prevent this increase, the control target of FB control on the optical amplifier 14 is switched at the clock time T2 from the first control target value 332, which is associated with the optical output power from the optical amplifier 14, to the second control target value 333, which is associated with external output from the optical transmission device 1. This switching of FB control on the optical amplifier 14 allows the external output to remain at the second control target value 333, which is the designated optical output power value.

The procedure then returns to Step S36, and FB control with a control target value set to the second control target value 333 is continuously performed, for example, until the power supply for the optical transmission device 1 is turned off. Note that FF control on the VOA 16 is completed at a clock time Tv.

Figure 5:
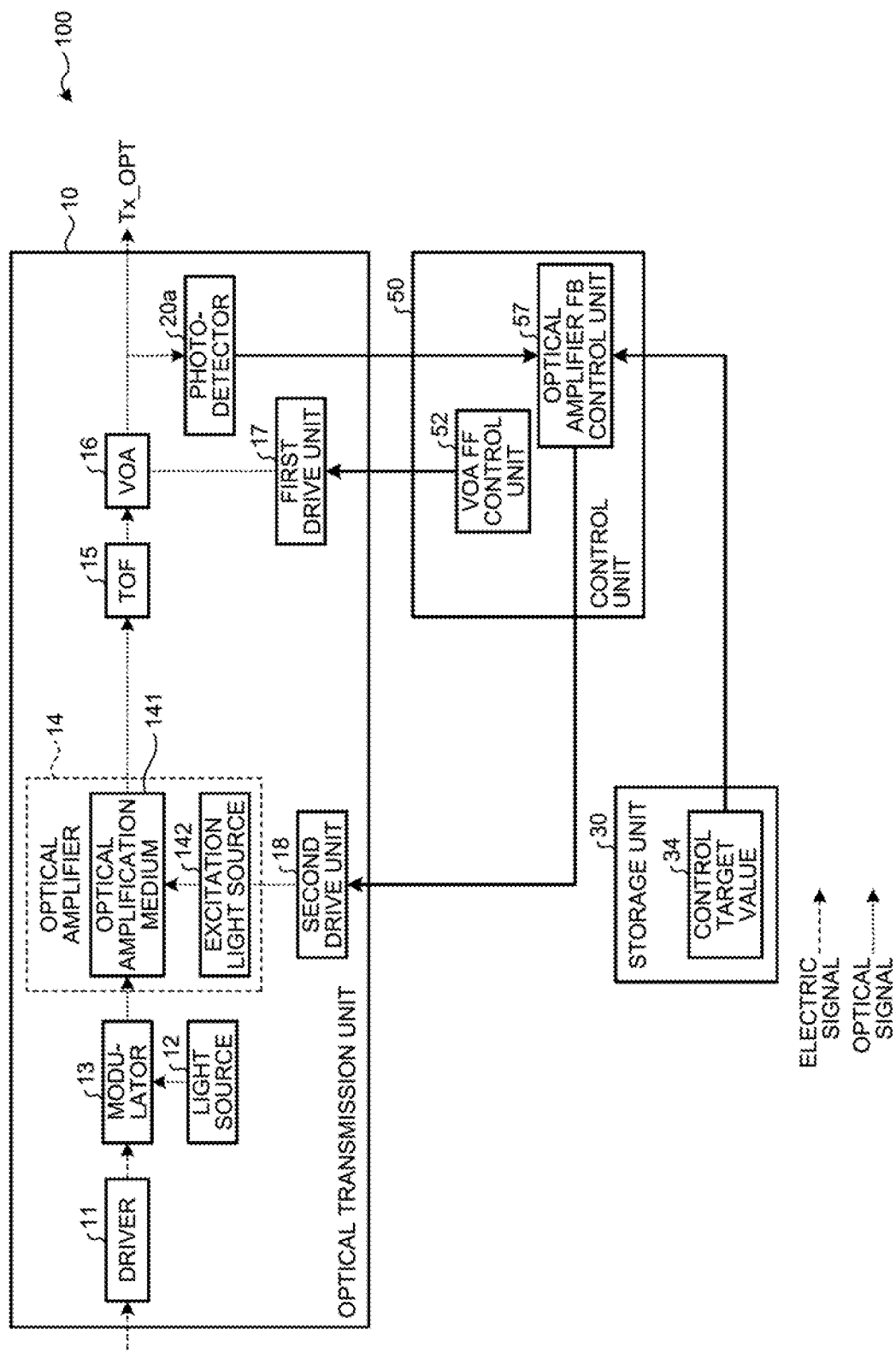
FIG. 5 is a diagram schematically illustrating the configuration of an optical transmission device according to a comparative example.

Here, the effects of the present embodiment are described in comparison with a comparative example. FIG. 5 is a diagram schematically illustrating the configuration of an optical transmission device according to the comparative example. An optical transmission device 100 includes the optical transmission unit 10, the storage unit 30, and the control unit 50. Unlike the counterpart illustrated in FIG. 1 according to the present embodiment, the optical transmission unit 10 does not include the first photo-detector 19 provided to the output side of the optical amplifier 14 but includes a photo-detector 20a provided to the output side of the VOA 16 only.

The control unit 50 includes the VOA FF control unit 52 and an optical amplifier FB control unit 57. The VOA FF control unit 52 performs FF control so that the attenuation amount for the VOA 16 can attain a target level when the optical transmission device 100 is started up. After the completion of the FF control on the VOA 16, the optical amplifier FB control unit 57 performs FB control so that the external output from the optical transmission device 100 that is detected by the photo-detector 20a can attain a control target value. The storage unit 30 stores therein a control target value 34 for FB control on the optical amplifier 14. The same reference signs are used for the same components as those included in the embodiment, and descriptions of such components are omitted.

Figure 6:
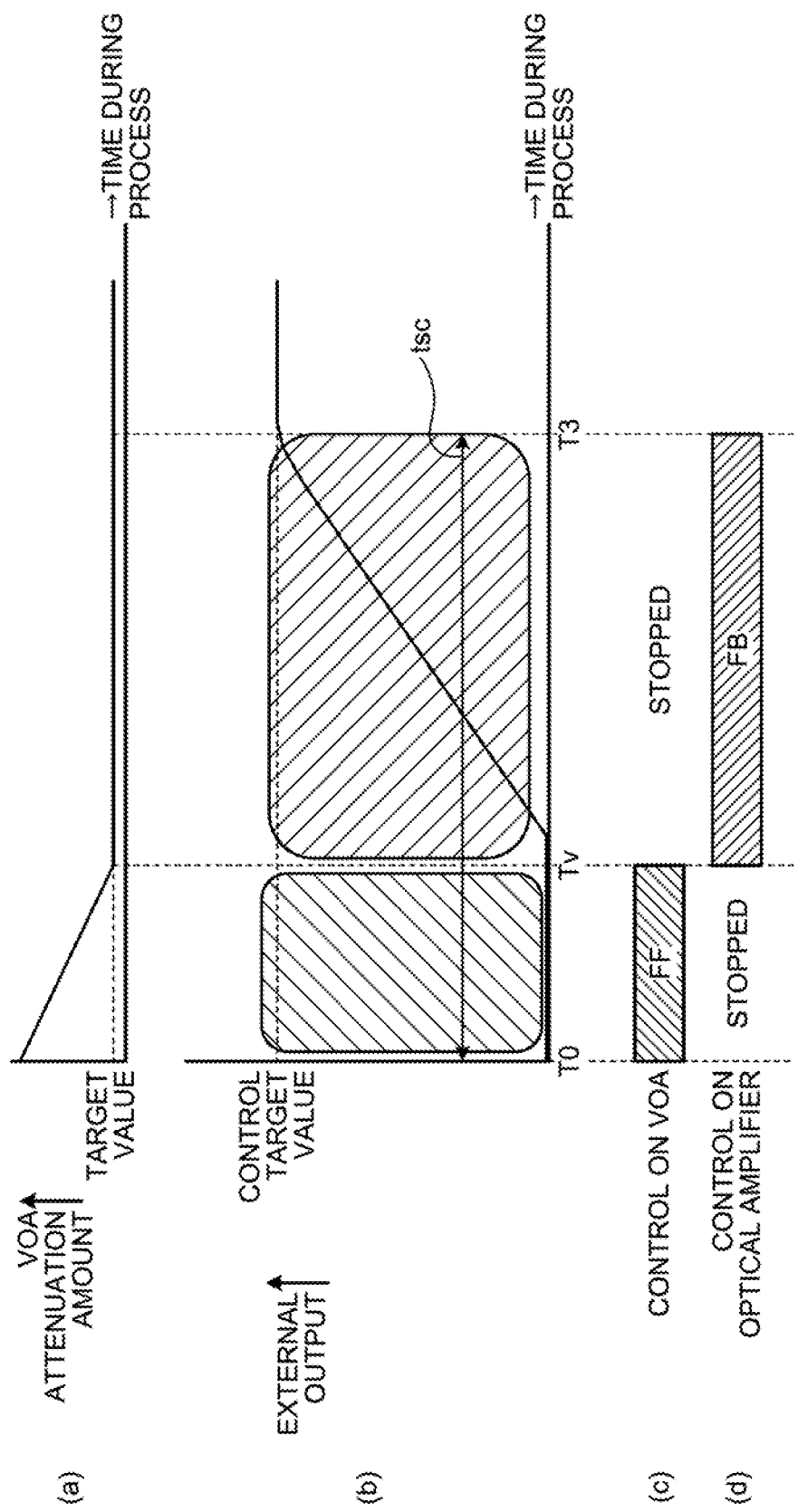
FIG. 6 is a time chart illustrating the procedure of a control process to be performed when the optical transmission device according to the comparative example is started up.

FIG. 6 is a time chart illustrating the procedure of a control process to be performed when the optical transmission device according to the comparative example is started up. Part (a) of FIG. 6 is a diagram illustrating change in attenuation amount for the VOA over time with the horizontal axis representing the time during the process and the vertical axis representing the attenuation amount for the VOA. Part (b) of FIG. 6 is a diagram illustrating change in optical output from the optical transmission device over time with the horizontal axis representing the time during the process and the vertical axis representing the output value of the optical transmission device monitored by the photo-detector. Part (c) of FIG. 6 is a diagram illustrating a control mode for the VOA, and part (d) of FIG. 6 is a diagram illustrating control modes for the optical amplifier.

In the comparative example, after the startup of the optical transmission device 100, at a clock time T0, the VOA FF control unit 52 in the control unit 50 sets the first drive unit set value 321 for the first drive unit 17, whereby FF control is started. During this period, the optical amplifier 14 is being stopped, and the optical signal is not externally output.

Once the attenuation amount for the VOA 16 attains a target value and converges at the clock time Tv, FF control on the VOA 16 is stopped, and the optical amplifier FB control unit 57 starts performing FB control on the optical amplifier 14 so that the optical output power detected by the photo-detector 20a can attain the control target value 34 stored in the storage unit 30. Once a monitored value that is external output detected by the photo-detector 20a attains the control target value 34, any processes that the optical transmission device 100 needs to perform are started. In the comparative example, FB control is thus performed on the optical amplifier 14 after the completion of FF control on the VOA 16. With a clock time T3 representing the time when a value monitored by the photo-detector 20a attains the control target value 34, a startup time tsc needed by the optical transmission device 100 in the comparative example is (T3–T0), and this value is larger than a time (Tv–T0) needed to complete FF control on the VOA 16.

Instead, in the present embodiment, the first drive unit 17 and the second drive unit 18 are controlled in parallel at the time of startup so that target values for these units can be attained. Consequently, as illustrated in Part (c) of FIG. 4, the startup time ts according to the present embodiment is shorter than the time (Tv–T0) needed to complete FF control on the VOA 16. That is, the configuration according to the present embodiment enables the optical transmission device 1 to have a reduced startup time than the comparative example.

In addition, the optical amplifier 14 is provided with: the optical amplifier FF control unit 53 that performs FF control immediately after the startup; the first FB control unit 54 that, once the optical output power from the optical amplifier 14 attains the control switch target value 331, performs FB control so that the optical output power from the optical amplifier 14 can attain the first control target value 332; the second FB control unit 55 that, once the optical output power from the optical amplifier 14 attains the first control target value 332, performs FB control so that the external output can attain the second control target value 333; and the first switch unit 56 that switches between these control units. This configuration enables a sharp rise in output from the optical amplifier 14 in the same manner as during FF control even after the completion of FF control, thereby making it possible for the startup to take less time than FF control on the VOA 16.

In addition to the second photo-detector 20 provided to the output side of the VOA 16, the first photo-detector 19 is provided between the optical amplifier 14 and VOA 16. Thus, the first photo-detector 19 is monitored, whereby FB control on the optical amplifier 14 can be performed in parallel with FF control on the VOA 16.

While the embodiment relating to the optical transmission device 1 and the method for controlling the optical transmission device 1 have been described above, the present invention may be implemented in various different forms other than the embodiment described above. For this reason, modifications are described below.

First Modification

Figure 7:
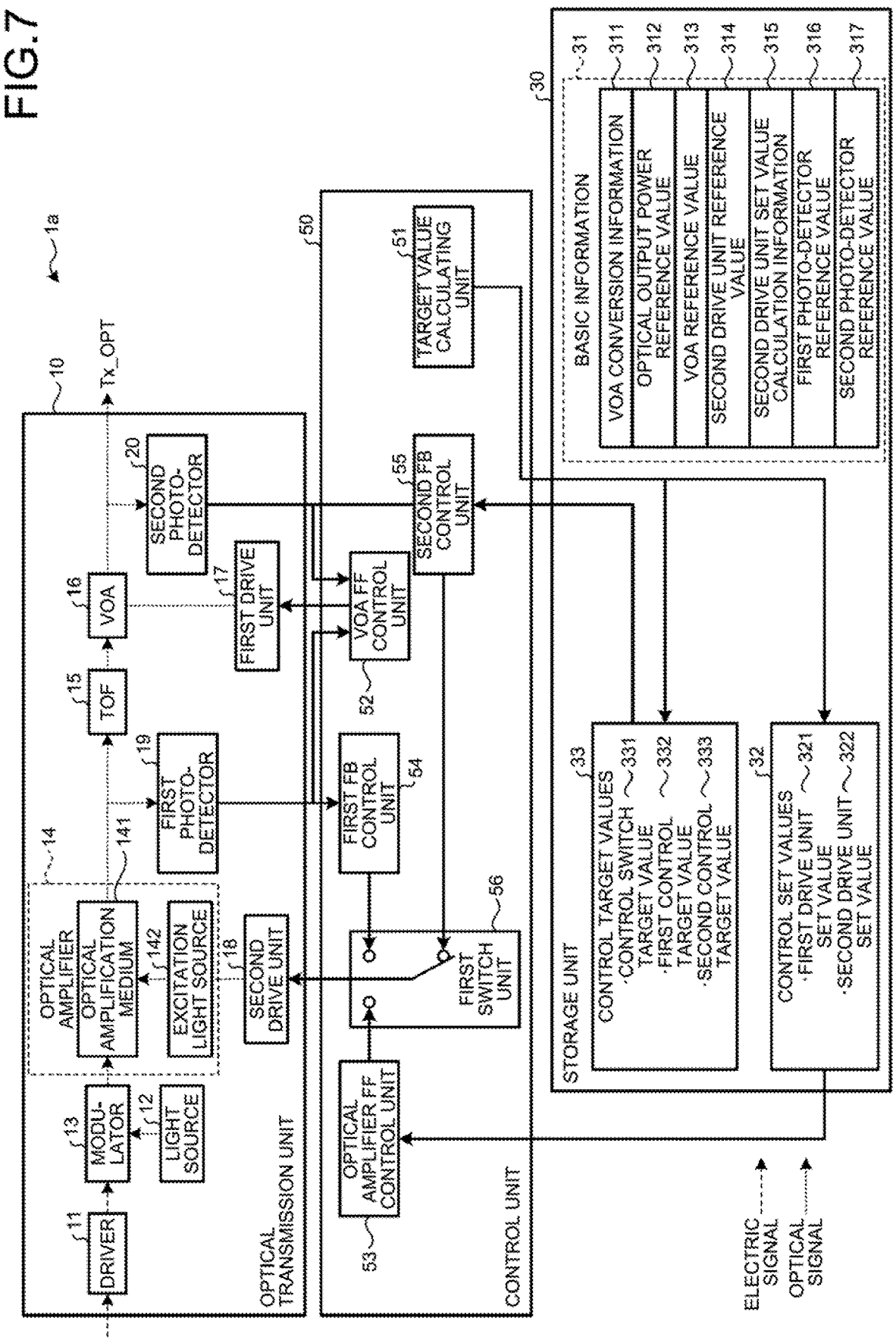
FIG. 7 is a diagram schematically illustrating an example of the configuration of an optical transmission device according to a first modification.

FIG. 7 is a diagram schematically illustrating an example of the configuration of an optical transmission device according to a first modification. In an optical transmission device 1a according to the first modification, the output from the first photo-detector 19 and the second photo-detector 20 is also output to the VOA FF control unit 52. At the clock time T2 at which the optical output power from the optical amplifier 14 attains the first control target value 332, the target value calculating unit 51 calculates an updated value of the first drive unit set value 321 and stores this updated value in the storage unit 30. Specifically, at the clock time T2, the target value calculating unit 51: sets, as the attenuation amount for the VOA 16, the difference between the respective output values of the first photo-detector 19 and the second photo-detector 20; acquires, from the VOA conversion information 311, a voltage value corresponding to this attenuation amount; and stores, in the storage unit 30, the acquired voltage value as an updated value of the first drive unit set value 321. In FIG. 7, the TOF 15 is provided between the first photo-detector 19 and the second photo-detector 20, and a value obtained by correcting the difference between the respective output values of the first photo-detector 19 and the second photo-detector 20 using an attenuation amount at the TOF 15 may be selected as the attenuation amount to be applied to the VOA 16. Alternatively, the first photo-detector 19 may be disposed between the TOF 15 and the VOA 16 in order to obtain an accurate attenuation amount for the VOA 16.

At the clock time T2, the VOA FF control unit 52 stops FF control that has been performed so far, acquires the updated value of the first drive unit set value 321 from the storage unit 30, and applies voltage designated as the updated value of the first drive unit set value 321 to the first drive unit 17. FIG. 7 uses the same reference signs for the same components as those illustrated in FIG. 1, and descriptions of such components are omitted.

Figure 8:
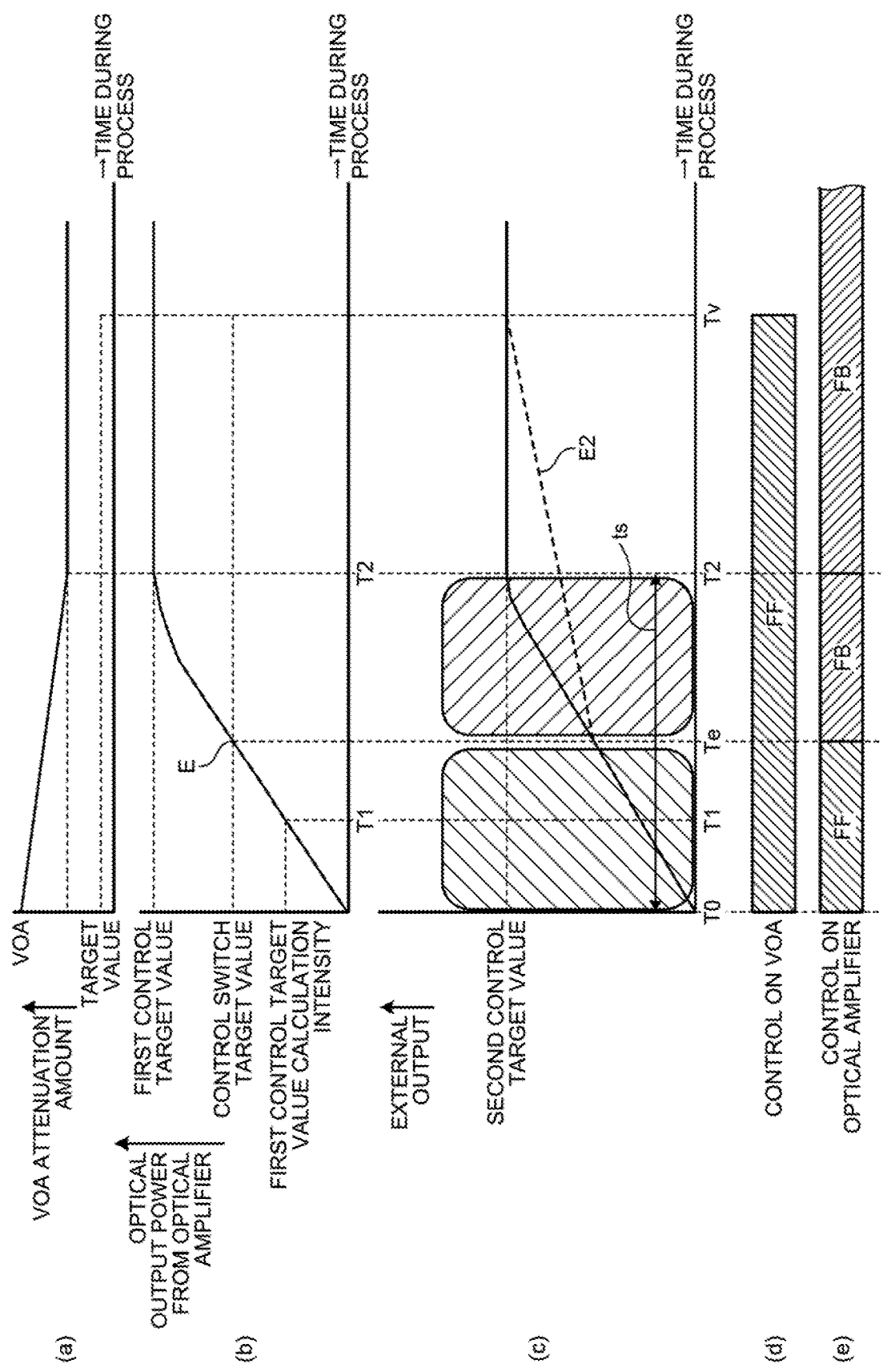
FIG. 8 is a time chart illustrating an example of the procedure of a control process in the optical transmission device according to the first modification.

FIG. 8 is a time chart illustrating an example of the procedure of the control process of the optical transmission device according to the first modification. Part (a) of FIG. 8 is a diagram illustrating change in attenuation amount for the VOA over time with the horizontal axis representing the time during the process and the vertical axis representing the attenuation amount for the VOA. Part (b) of FIG. 8 is a diagram illustrating change in optical output from the optical amplifier over time with the horizontal axis representing the time during the process and the vertical axis representing the output value of the optical amplifier monitored by the first photo-detector. Part (c) of FIG. 8 is a diagram illustrating change in optical output from the optical transmission device over time with the horizontal axis representing the time during the process and the vertical axis representing the output value of the optical transmission device monitored by the second photo-detector. Part (d) of FIG. 8 is a diagram illustrating control modes for the VOA, and part (e) of FIG. 8 is a diagram illustrating control modes for the optical amplifier.

In FIG. 8, until the clock time T2, the same process as the corresponding process in the embodiment is executed. At the clock time T2, the VOA FF control unit 52 stops performing FF control on the VOA 16. In addition, the target value calculating unit 51: calculates an attenuation amount for the VOA 16 using the output intensities of the first photo-detector 19 and the second photo-detector 20; acquires, from the VOA conversion information 311, a voltage value corresponding to the calculated attenuation amount; and sets the voltage value as an updated value of the first drive unit set value 321. The first drive unit 17 applies the updated value of the first drive unit set value 321 to the VOA 16. Note here that, after the clock time T2, the same control as in the embodiment may be performed, or the optical output power from the optical amplifier 14 may be maintained constant because the attenuation amount for the VOA 16 is unchanged. Thus, the external output from the optical transmission device 1a can be maintained constant.

Second Modification

Figure 9:
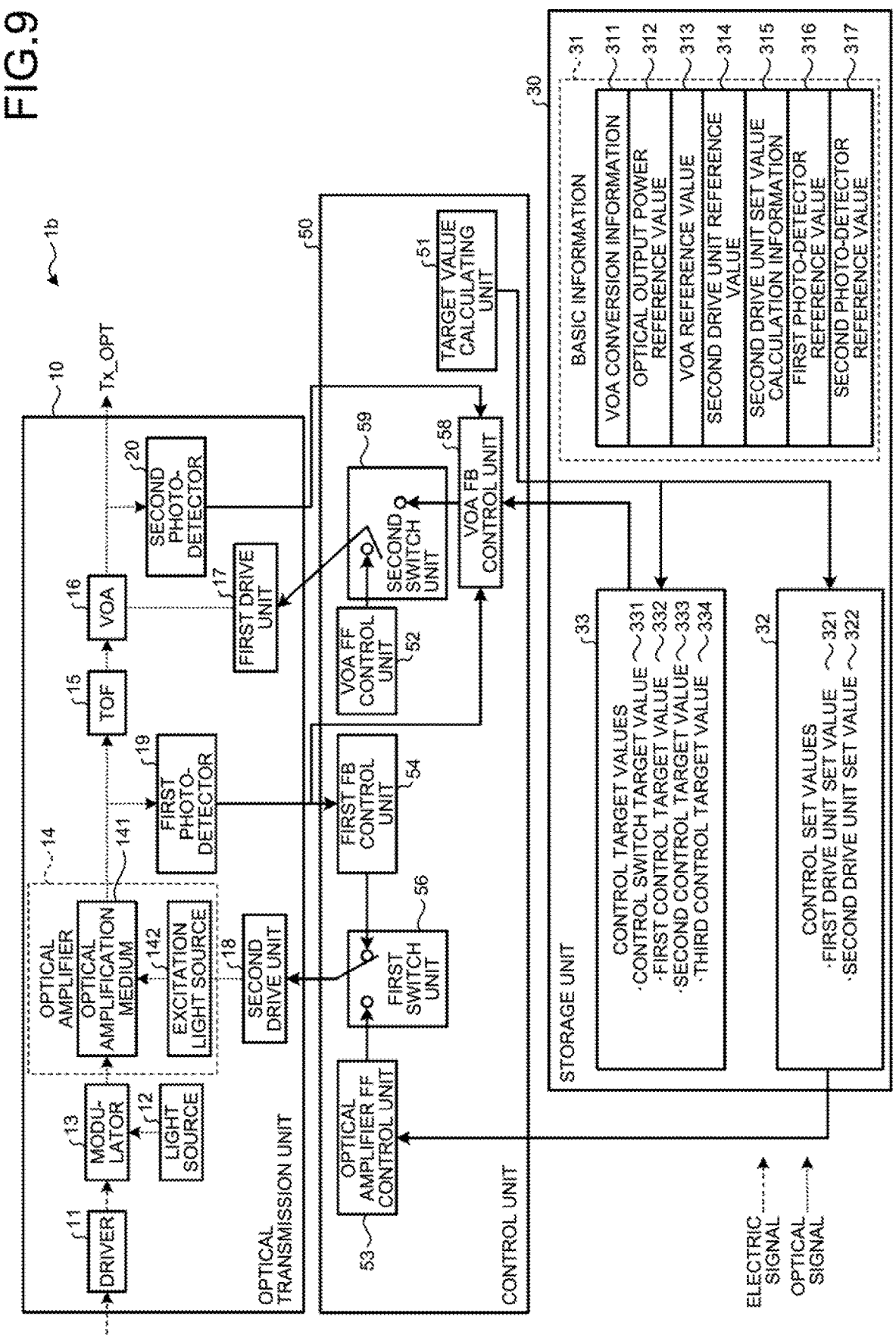
FIG. 9 is a diagram schematically illustrating an example of the configuration of an optical transmission device according to a second modification.

FIG. 9 is a diagram schematically illustrating an example of the configuration of an optical transmission device according to a second modification. In an optical transmission device 1b according to the second modification, the configuration of the control unit 50 differs from the one illustrated in FIG. 1. That is, the control unit 50 does not include the second FB control unit 55 but includes a VOA FB control unit 58 and a second switch unit 59 instead. In addition, the first photo-detector 19 and the second photo-detector 20 output detection results to the VOA FB control unit 58.

The target value calculation function of the target value calculating unit 51 further functions to calculate a third control target value to be used in performing FB control on the VOA 16 after the clock time T2 at which the optical output power from the optical amplifier 14 attains the second target value. Specifically, the target value calculating unit 51 calculate an attenuation amount for the VOA 16 based on output from the first photo-detector 19 and the second photo-detector 20 at the clock time T2 and stores this calculated attenuation amount as a third control target value 334 for use in FB control on the VOA 16 in the storage unit 30. The third control target value 334 is also stored in the storage unit 30.

At the clock time T2, the VOA FB control unit 58 acquires the third control target value 334 from the storage unit 30, sets the third control target value 334 for the first drive unit 17, and starts FB control using output intensities detected by the first photo-detector 19 and the second photo-detector 20.

The second switch unit 59 switches the first drive unit 17 into connection with the VOA FB control unit 58 at the clock time T2 or upon detecting that the optical output power from the optical amplifier 14 has attained the first control target value 332.

In the embodiment, the first switch unit 56 switches from the first FB control unit 54 to the second FB control unit 55 at the clock time T2 at which the output intensity of the optical amplifier 14 attains the first control target value 332. In the second modification, however, the first FB control unit 54 performs FB control so that the output intensity of the optical amplifier 14 can be maintained at the first control target value 332 continuously after the clock time Te. After the clock time Te, FB control is thus performed on the VOA 16 and on the optical amplifier 14 in parallel so that certain target values can be attained for both of the VOA 16 and the optical amplifier 14, whereby external output from the optical transmission device 1b can also be maintained at a designated optical output power value.

FIG. 9 uses the same reference signs for the same components as those illustrated in FIG. 1, and descriptions of such components are omitted. A time chart for the startup process of the optical transmission device 1b according to the second modification is the same as the one illustrated in FIG. 8.

Third Modification

Figure 10:
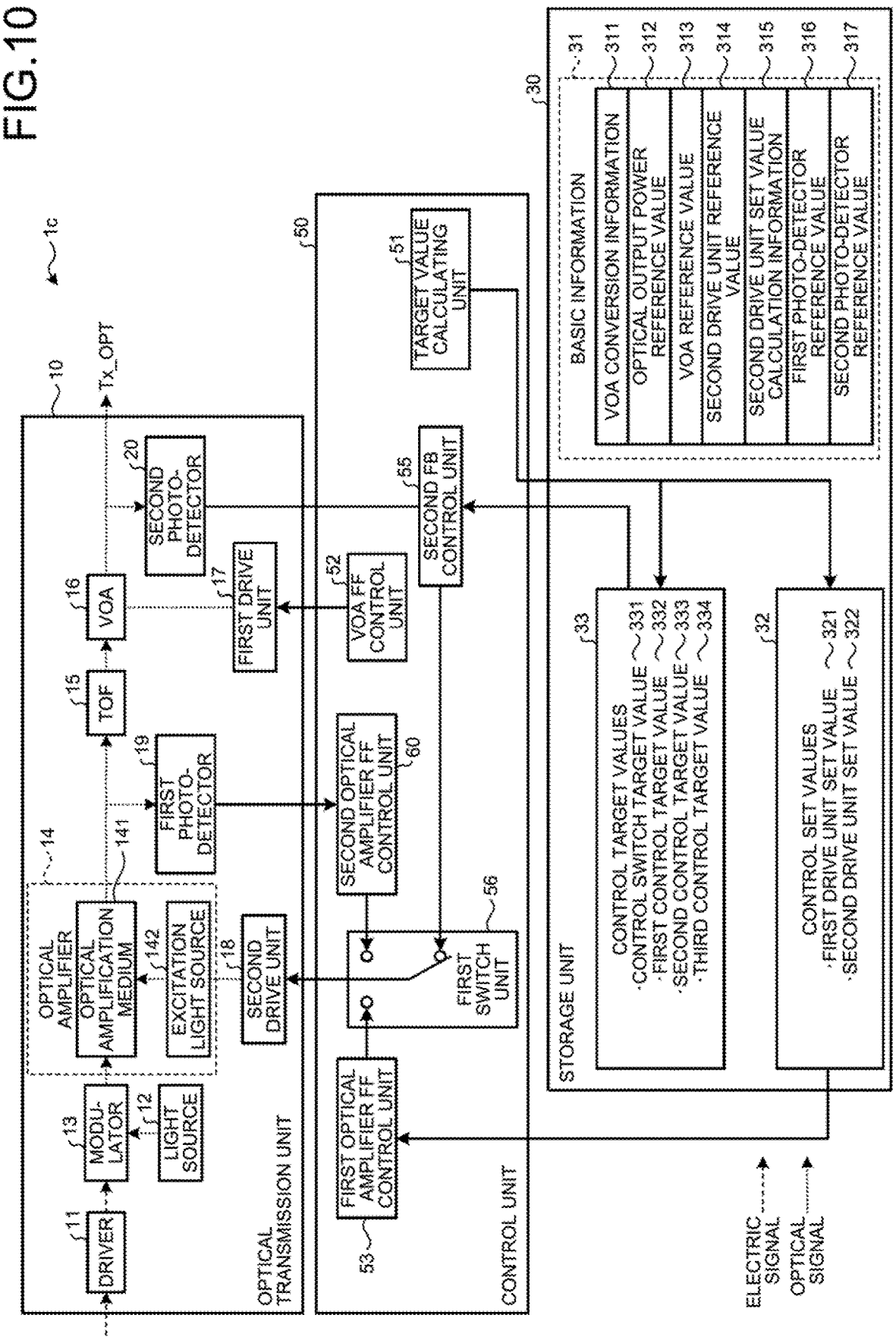
FIG. 10 is a diagram schematically illustrating an example of the configuration of an optical transmission device according to a third modification.

FIG. 10 is a diagram schematically illustrating an example of the configuration of an optical transmission device according to a third modification. In an optical transmission device 1c according to the third modification, the configuration of the control unit 50 differs from that illustrated in FIG. 1. That is, the control unit 50 does not include the first FB control unit 54 but includes a second optical amplifier FF control unit 60 instead. In addition, the optical amplifier FF control unit 53 illustrated in FIG. 1 is referred to as a first optical amplifier FF control unit 53.

The second optical amplifier FF control unit 60 performs FF control so that the optical intensity of the optical amplifier 14 can attain an updated value of the second drive unit set value 322. In this case, the updated value of the second drive unit set value 322 is a voltage value to be applied to the excitation light source 142 when the optical amplifier 14 outputs the optical output power that assumes the first control target value 332 found in the embodiment. The second optical amplifier FF control unit 60 corresponds to a first control unit.

After calculating the first control target value 332, the target value calculating unit 51 calculates a voltage value that corresponds to the first control target value 332 and is to be applied to the excitation light source 142 and stores this voltage value, as an updated value of the second drive unit set value 322, in the storage unit 30.

FIG. 10 uses the same reference signs for the same components as those illustrated in FIG. 1, and descriptions of such components are omitted. A time chart for the startup process of the optical transmission device 1c according to the third modification is the same as the one illustrated in FIG. 4.

Figure 11:
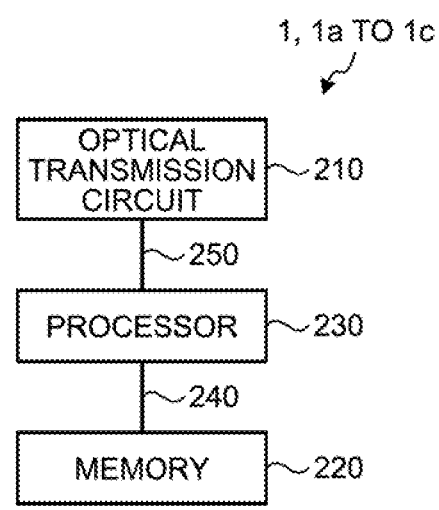
FIG. 11 is a diagram illustrating an example of the hardware configuration of each of the optical transmission devices according to the embodiment and the first to the third modifications.

FIG. 11 is a diagram illustrating an example of the hardware configuration of each of the optical transmission devices according to the embodiment and the first to the third modifications. Each of the optical transmission devices 1 and 1a to 1c includes an optical transmission circuit 210, a memory 220, and a processor 230. While the memory 220 and the processor 230 are connected to each other via, for example, a bus 240, the processor 230 and the optical transmission circuit 210 are connected to each other, for example, via a signal line 250. The above-described optical transmission unit 10 in each of the embodiment and the first to the third modifications is implemented by the optical transmission circuit 210. The above-described storage unit 30 in each of the embodiment and the first to the third modifications is implemented by the memory 220. The target value calculating unit 51, the VOA FF control unit 52, the optical amplifier FF control unit 53, the first FB control unit 54, the second FB control unit 55, the first switch unit 56, the VOA FB control unit 58, the second switch unit 59, and the second optical amplifier FF control unit 60 described above in each of the embodiment and the first to the third modifications are implemented by the processor 230.

The present embodiment thus can reduce the time needed for startup.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. An optical transmission device comprising:
an optical amplifier including an excitation light source and an optical amplification medium into which an optical signal and excitation light emitted from the excitation light source are guided;
a variable optical attenuator that adjusts an attenuation amount of an optical signal that is output from the optical amplifier;
a first drive unit that drives the variable optical attenuator;
a second drive unit that drives the excitation light source;
a first photo-detector that branches a part of the optical signal output from the optical amplifier and detects optical output power of the branched part of the optical signal;
a first Feed-Forward (FF) control unit that sets a first set value for the first drive unit at a time of startup and performs feed-forward control on the first drive unit;
a second Feed-Forward (FF) control unit that sets a second set value for the second drive unit at the time of startup and performs feed-forward control on the second drive unit;
a first control unit that controls the second drive unit in a manner that causes an optical output power of the optical signal that is output from the optical amplifier to attain a first control target value, the optical output power being detected by the first photo-detector; and
a first switch unit that switches from the second Feed-Forward (FF) control unit to the first control unit when an optical output power from the optical amplifier that corresponds to the second set value is attained as a result of feed-forward control performed by the second Feed-Forward (FF) control unit.

2. The optical transmission device according to claim 1, wherein the first control unit performs feed-back control on the second drive unit in a manner that causes the optical output power detected by the first photo-detector to attain the first control target value.

3. The optical transmission device according to claim 1, wherein the first control unit sets a third set value for the second drive unit and performs feed-forward control on the second drive unit, the third set value being a voltage value to be applied to the excitation light source, the voltage value corresponding to the first control target value.

4. The optical transmission device according to claim 1, further comprising:
- a second photo-detector that branches a part of an optical signal output from the variable optical attenuator and detects an optical output power of the branched part of the optical signal; and
- an Feed-Back (FB) control unit that performs Feed-Back (FB) control on the second drive unit in a manner that causes an external output of the optical signal output from the variable optical attenuator to attain a second control target value, the external output being detected by the second photo-detector, wherein
- the first switch unit switches from the first control unit to the Feed-Back (FB) control unit when the optical output power detected by the first photo-detector attains the first control target value as a result of feed-back control performed by the first control unit.

5. The optical transmission device according to claim 4, wherein the second photo-detector is disposed immediately ahead of the variable optical attenuator.

6. A method for controlling an optical transmission device, the method comprising:
- setting a first set value for a first drive unit at a time of startup and performing feed-forward control on the first drive unit, the first drive unit being configured to drive a variable optical attenuator that adjusts an attenuation amount of an optical signal output from an optical amplifier;
- setting a second set value for a second drive unit at the time of startup and performing feed-forward control on the second drive unit, the second drive unit being configured to drive an excitation light source included in the optical amplifier; and
- when optical output power from the optical amplifier that corresponds to the second set value is attained as a result of the feed-forward control on the second drive unit, switching to a first control unit in which the second drive unit is controlled in a manner that causes an optical output power of the optical signal output from the optical amplifier to attain a first control target value, the optical output power of the optical signal output from the optical amplifier being detected by a first photo-detector.

7. The method for controlling an optical transmission device according to claim 6, wherein the switching to the first control unit includes performing feed-back control on the second drive unit in a manner that causes the optical output power detected by the first photo-detector to attain the first control target value.

8. The method for controlling an optical transmission device according to claim 6, wherein the switching to the first control unit includes: setting a third set value for the second drive unit, the third set value being a voltage value to be applied to the excitation light source, the voltage value corresponding to the first control target value; and performing feed-forward control on the second drive unit.

* * * * *